United States Patent [19]

Satoh

[11] Patent Number: 5,696,646
[45] Date of Patent: Dec. 9, 1997

[54] DISK APPARATUS FOR MONITORING ERROR BY SETTING TIMEOUT TIME UPON SEEK

[75] Inventor: Atsushi Satoh, Higashine, Japan

[73] Assignee: Fujitsu Limited, Kawasaki, Japan

[21] Appl. No.: 567,315

[22] Filed: Dec. 5, 1995

[30] Foreign Application Priority Data

Apr. 21, 1995 [JP] Japan ................................. 7-096582

[51] Int. Cl.$^6$ ..................................................... G11B 5/55
[52] U.S. Cl. ................................. 360/78.04; 360/78.07
[58] Field of Search ........................... 360/78.04, 78.06, 360/78.07, 78.09

[56] References Cited

U.S. PATENT DOCUMENTS

| | | | |
|---|---|---|---|
| 4,803,572 | 2/1989 | Haruna et al. | 360/78.04 X |
| 5,010,425 | 4/1991 | Asai | 360/78.04 |
| 5,231,550 | 7/1993 | Hashimoto | 360/78.06 |

FOREIGN PATENT DOCUMENTS

| | | | |
|---|---|---|---|
| 58-177573 | 10/1983 | Japan | 360/78.04 |
| 1-205772 | 8/1989 | Japan | |
| 1-205773 | 8/1989 | Japan | |
| 3-260972 | 11/1991 | Japan | 360/78.04 |
| 4-222970 | 8/1992 | Japan | 360/78.04 |

OTHER PUBLICATIONS

"Method of Calculating Seek Times for Disk Drives," IBM TDB vol. 29, No. 6, Nov. 1986, pp. 2551-2554.

*Primary Examiner*—Aristotelis M. Psitos
*Assistant Examiner*—James L. Habermehl
*Attorney, Agent, or Firm*—Greer, Burns & Crain, Ltd.

[57] ABSTRACT

Seek operation of a seek control section is monitored by an error monitoring section, and when a seek operation does not end normally, the control is forcedly switched over to fine control by the on-track control section without reporting the error to the higher-level controller. The error monitoring section variably sets a seek timeout time Ts depending on the seek distance between the current position of the head and the target position at the start of seek, for example. When the seek timeout time Ts elapses before the target position is reached, it is judged as an error.

12 Claims, 12 Drawing Sheets

DISK APPARATUS FOR MONITORING ERROR BY SETTING TIMEOUT TIME UPON SEEK

BACKGROUND OF THE INVENTION

The present invention relates to a disk apparatus for monitoring an error in seek operation by setting a seek timeout time upon starting seek operation. More particularly, the present invention relates to a disk apparatus which performs recovery upon occurrence of a seek error in an expedited manner.

With a view to responding to a demand for higher performance magnetic disk apparatuses, data and servo information are recorded at a high recording density in a disk medium. In a disk apparatus of such a high recording density, when an error occurs during a seek operation, which positions the head on the disk drive side to the target cylinder position by speed control, an error report is submitted to a higher-level controller, and a recovery processing is carried out through issuance of a retry command. The processing performance is reduced that much. It would therefore be an improvement to cause the seek operation to normally end by conducting recovery processing on the disk drive side in an expedited manner, without submitting the error report to the higher-level controller even upon occurrence of an error.

Figure 1:
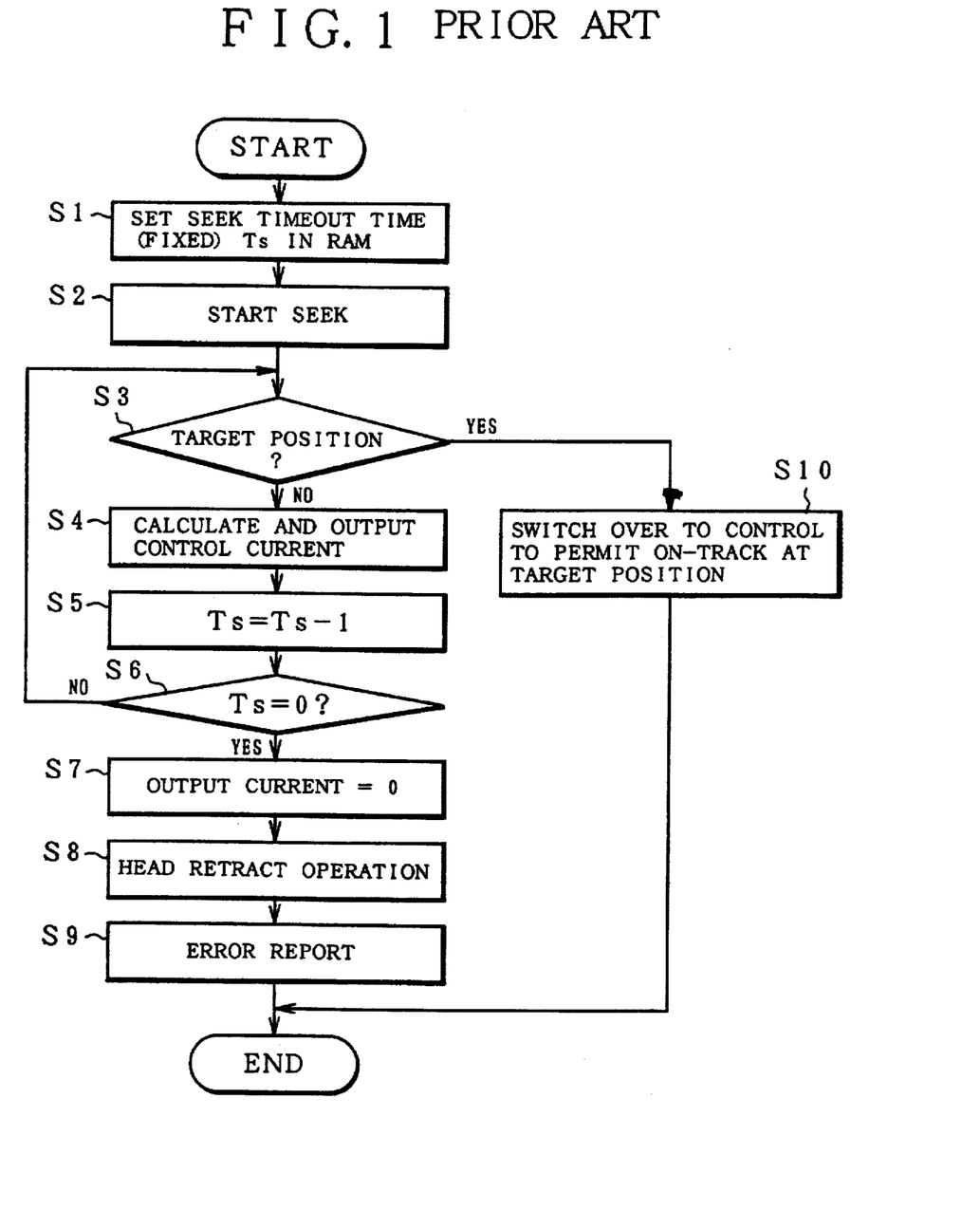
FIG. 1 is a flowchart of the conventional seek processing.

In the conventional magnetic disk apparatus, a limit is imposed on the time of seek operation, and this is called the seek timeout time. Prior to a seek operation, a fixedly predetermined seek timeout time is set in a RAM. During seek, the contents of the RAM are submitted one by one through an interruption process with a servo signal, and an error is determined at a point when the contents of the RAM become null. When an error occurs, the current flowing to the VCM is cut, and a retract operation of sending the head back to the innermost initial position is performed. FIG. 1 is a flowchart of the conventional seek operation. The process in step S1 is to set a seek timeout time Ts fixedly determined by the RAM. As the seek timeout time Ts, a time of, for example, about 50 ms is set, which is available by adding a margin to a time required for moving the head by the number of cylinders resulting in the maximum amount of travel. Upon starting seek then in step S2, it is checked in step S3 whether the target cylinder position has been reached or not, and the control current is calculated in step S4. Seek control is performed through speed control of a voice coil motor (VCM), and acceleration, constant-speed or deceleration control is applied in response to the number of cylinders remaining before the target cylinder position. This speed control is usually called coarse control. Then in step S5, the value of seek timeout time Ts set in the RAM is reduced one by one, and in step S6, it is checked if the result is 0 or not. If the target position is reached before the seek timeout time Ts in the RAM becomes 0, the processing routine advances to step S10, and the control is changed over to fine control which positions the head at the center of the target cylinder for normal end. When the seek timeout time Ts becomes 0 before the target cylinder position is reached, on the other hand, this is judged to be an error, and the output current is turned to 0 in step S7 to discontinue the seek operation. In step S8 then, the head is brought to the innermost initial position to perform a retract operation in which the head hits a stopper and a magnet or the like is caused to latch the head. In step S9, the error is reported to a higher-level controller. In response to this error report, the higher-level controller issues a retry command to cause seek operation again. When the error is not corrected even after several retries in a prescribed number, the disk unit is separated as an error device.

In the conventional disk apparatus, as described above, retract operation is performed upon occurrence of an error. Consequently, if seek operation is conducted pursuant to a retry command from the higher-level controller having received an error report, the head would return to the initial position under the effect of the retract operation and seek then to the target cylinder position. This results in a longer distance to the target cylinder position, taking a longer period of time for the seek operation, thus leading to deterioration of performance of the apparatus. As the timeout time is constant irrespective of a difference in seek distance, it is impossible to promptly detect occurrence of an error during a seek operation of a short distance.

SUMMARY OF THE INVENTION

According to the present invention, there is provided a disk apparatus which inhibits deterioration of performance by conducting recovery upon occurrence of an error on the disk drive side as fast as possible, and furthermore, permits monitoring of an error with an appropriate seek timeout time in response to the seek distance.

The disk apparatus of the invention comprises a seek control section which moves the head to a target cylinder position of the disk medium as instructed by a higher-level device, an on-track control section which, upon normal end of a seek operation of the seek control section, changes over control to fine control and positions the head at the target cylinder position for follow-up and in addition, an error monitoring section which monitors seek operations of the seek control section, and when a seek operation does not end normally, forcedly changes over control to fine control by the on-track control section without submitting an error report to the higher-level controller. The error monitoring section sets an optimum seek timeout time Ts corresponding to the seek distance between the current position of the head and the target position at the beginning of seek, and when the seek timeout time Ts elapses before the target position is reached, judges it as an error. For example, the error monitoring section calculates and sets an optimum seek timeout time Ts corresponding to the seek distance between a straight line connecting two points determined by the seek distance and the seek time, on the one hand, and the seek distance from the current position of the head at the start of seek to the target position, on the other hand. The error monitoring section may comprise a seek information storing section which stores the result of measurement of the seek time relative to the seek distance, to set an optimum seek timeout time Ts with reference to the seek information storing section, depending upon the seek distance between the current position of the head at the start of seek and the target position. Furthermore, the error monitoring section may polygonal-line approximate the result of measurement of the seek time relative to the seek distance by means of a plurality of straight lines, and calculate and set an optimum seek timeout time Ts from the corresponding one from among the plurality of straight lines, depending upon the seek distance between the current position of the head at the start of seek and the target position.

The disk apparatus of the present invention is applicable to the data face servo system which detects the head position on the basis of sector servo information padding and recording servo information at the top of sector of the data face of the disk medium. It is applicable also to the servo face servo system which detects the head position on the basis of servo information of a special servo face recording only servo information in the disk medium. Furthermore, the apparatus of the present invention comprises a seek control section which moves the head to a target cylinder position of the disk medium as instructed by a higher-level device by speed control, an on-track control section which, upon normal end of seek operation by the seek control section, positions the head at a target cylinder position by changing over the control to fine control, and in addition, an error monitoring section which, at the time of start of seek by the seek control section, sets an optimum seek timeout time from the seek distance between the current position of the head and the target position, and upon the lapse of the seek timeout time before the target position is reached, judges it as an error. The optimum seek timeout time in this case may be set by linear interpolation, reference to the seek information storing section, or polygonal line interpolation with a plurality of straight lines.

According to the disk apparatus of the present invention, occurrence of a positioning error at the target cylinder by forcedly changing over control, upon occurrence of a seek error, from coarse control by the seek control section to fine control by the on-track control section on the disk drive side. When forcedly changing over the control to fine control upon occurrence of the seek error, it is possible to position the head at the target cylinder by fine control if the seek distance is within a prescribed range relative to the target cylinder, for example, within a range of ±8 cylinders. When the seek distance is outside the prescribed range relative to the target cylinder, control is switched over to fine control at this cylinder position, and because retry operation upon recognition of an error through readout of the cylinder address can be resumed from a cylinder position in the middle of seek, the seek distance upon retry operation is reduced, thus making it possible to promptly complete seek operation for retry. In addition, the present invention permits prompt recovery through early detection of an error within a short seek distance as compared with fixed time setting, since an optimum seek timeout time is variably set in accordance with the seek distance to the target cylinder at the start of seek.

The above and other objects, features, and advantages of the present invention will become more apparent from the following detailed description with reference to the drawings.

DETAILED DESCRIPTION OF THE PREFERRED EMBODIMENTS

Figure 2:
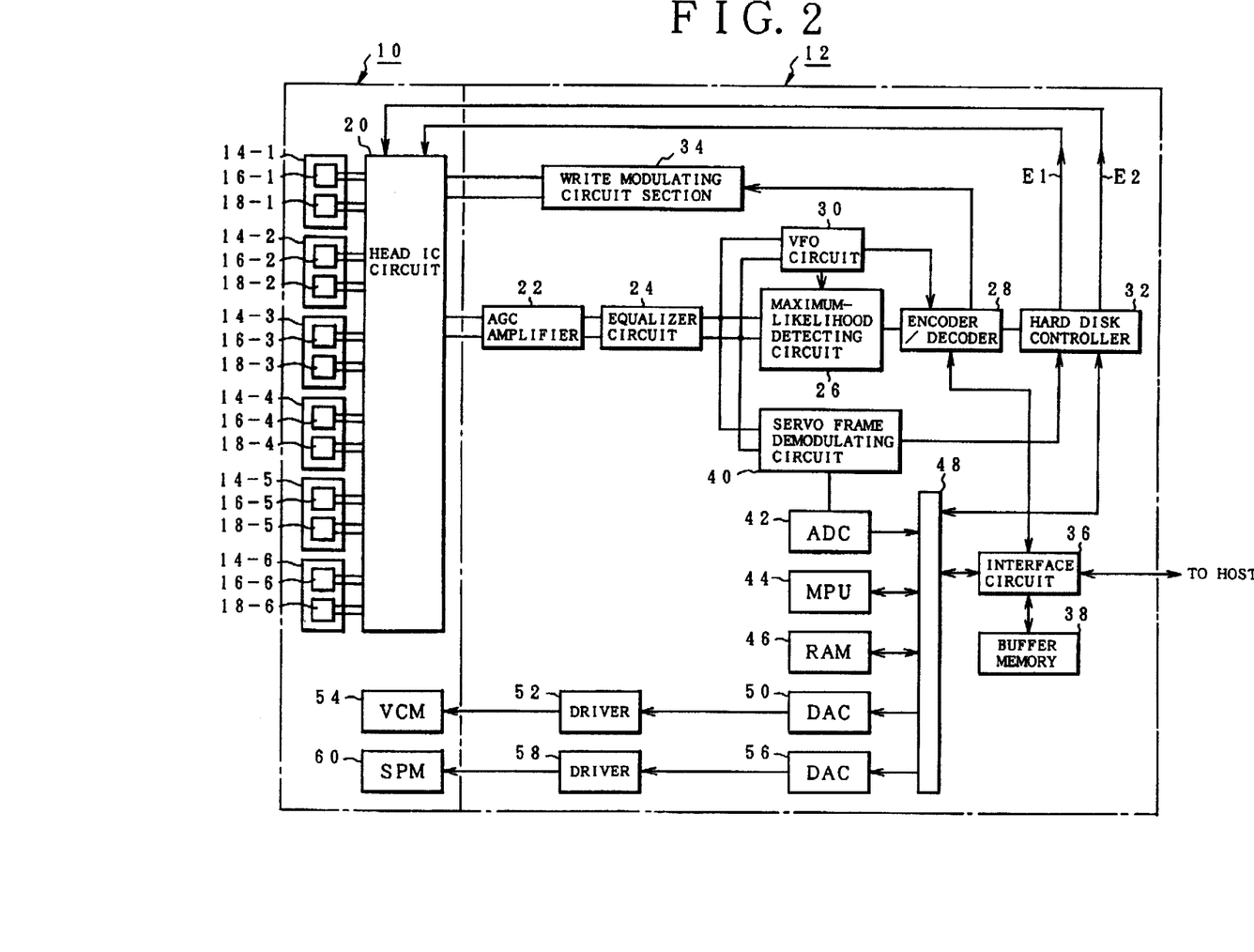
FIG. 2 is a block diagram of an embodiment of the present invention adopting data face servo.

FIG. 2 is a block diagram of a disk apparatus adopting data face servo to which the present invention is applicable. The disk apparatus comprises a disk enclosure 10 and a drive controller 12. As against a higher-level disk controller, this unit is called a disk drive or simply a drive. Six composite type heads 14-1 to 14-6 are provided in the disk enclosure 10 in this embodiment. Write heads 16-1 to 16-6 and read heads 18-1 to 18-6 are provided in the composite type heads 14-1 to 14-6, respectively. Inductive heads are used as the write heads 16-1 to 16-6. MR heads are used as the read heads 18-1 to 18-6. The composite type heads 14-1 to 14-6 are connected to a head IC circuit 20, and any thereof is selected by a head switchover signal E1 and a read/write switchover signal E2. For read operation, the head IC circuit 20 selects any one of the composite type heads 14-1 to 14-6, the composite type head 14-1, for example, by means of the head switchover signal E1, and at the same time, the read head 18-1 is selected in the composite type head 14-1 by validating read switchover by the read/write switchover signal E2, which is connected to an AGC amplifier 22 provided on the side of the drive controller 12. The readout signal from the read head 18-1 is amplified to a certain amplitude level by the AGC amplifier 22, and then subjected to equalization in an equalizer circuit 24 to remove interwaveform interference and then to decoding of bit data in a maximum/likelihood detecting circuit 26. The equalizer circuit 24 and the maximum-likelihood detecting circuit 26 compose a demodulating circuit based on partial response maximum-likelihood detection. In the case of partial response class-4 maximum-likelihood detection (PR4ML), for example, the equalizer circuit 24 performs equalization of (1+D), and the maximum-likelihood detecting circuit 26 conducts demodulation of bit data of a regenerated signal of partial response of (1+D) in accordance with the maximum-likelihood Viterbi detection method. An output of the equalizer circuit 24 is entered into a VFO circuit 30 to issue a clock signal for taking a timing necessary for read data demodulating operation. The data demodulated in the maximum-likelihood detecting circuit 26 is supplied to an encoder/decoder 28. At the time of read operation, the encoder/decoder has been switched over to the encoder side, and the demodulated data, a prescribed RLL sign for example, is converted into the original NRZ data. The NRZ data decoded by the encoder/decoder 28 is converted by an interface circuit 36 into a parallel data and then stored in a buffer memory 38. When a prescribed volume of data stored in the buffer memory 38 is reached, transfer of read data to the higher-level controller is started. A hard disk controller 32 takes charge of the control of the read modulating circuit section and the write modulating circuit section, and further, head switchover and read/write switchover for the head IC circuit 20 of the disk enclosure. During read operation, as required, the hard disk controller 32 serves as a formatter which performs ECC processing and the like of NRZ data available from the encoder function of the encoder/decoder 28. Upon write operation, for example, the write head 16-1 of the composite type head 14-1 is selected by validating the write switchover of the head selection signal E1 and the read/write switchover signal E2 to the head IC circuit 20. For this write NRZ data transferred from the higher-level controller is supplied through the interface circuit 36 to the encoder/decoder 28 as a serial NRZ data. Upon write operation, the encoder/decoder 28 which is operating as a decoder converts the NRZ data into a prescribed RLL sign and outputs the result of conversion to the write modulating circuit section 34. The write modulating circuit section 34 applies processing of 1/(1+D) conversion to PLL sign from the encoder/decoder 28, then carries out write compensation known as write precompensation, latches the result with a write FF, converts it into write current by means of the write drive, and supplies it to the write head 16-1 selected by the head IC circuit 20 to accomplish write to the disk medium.

In this read/write system, a servo frame demodulating circuit 40 containing regenerated signals entered from the equalizer 24 is provided to position the head at any cylinder position of the disk medium. Since this embodiment adopts the data face servo (sector servo) in which servo information is padded and recorded in a servo frame provided at the top of each sector of the data face, a readout signal from the read head selected from among the composite type heads upon read operation or write operation by the head IC circuit 20 is entered into the servo frame demodulating circuit 40, and head position information is demodulated from the servo information contained in the servo frame. The demodulated information is fetched into an MPU 44 via an AV converter and a bus 48. An RAM 46 deploying control data and processing programs is provided for MPU 44 through the bus 48. It is also possible to receive various commands received by the interface circuit 36 from the higher-level controller via the bus 48. Upon receipt of a seek command from the higher-level controller through the interface circuit 36, the MPU 44 conducts seek control which moves the head to a target cylinder position as instructed by the seek command. When the target cylinder position is reached, MPU 44 carries out fine control for positioning the head at the center of the target cylinder for followup. For the purpose of performing seek control and on-track control by the MPU 44, a DA converter 50 and a drive 52 are provided via the bus 48 for a voice coil motor (hereinafter referred to as a "VCM") 54 for driving the head actuator provided in the disk enclosure 10. The MPU 44 calculates control current necessary for the control of the VCM 54 and outputs the result of calculation to the DA converter 50. By driving the driver 52 through conversion into an analog signal in the DA converter 50, MPU 44 causes control current to flow to the VCM 54. Furthermore, a DA converter 56 and a driver 58 are provided for the spindle motor 60 provided in the disk enclosure 10, to cause the disk medium at a prescribed speed under control of the spindle motor 60.

Figure 3:
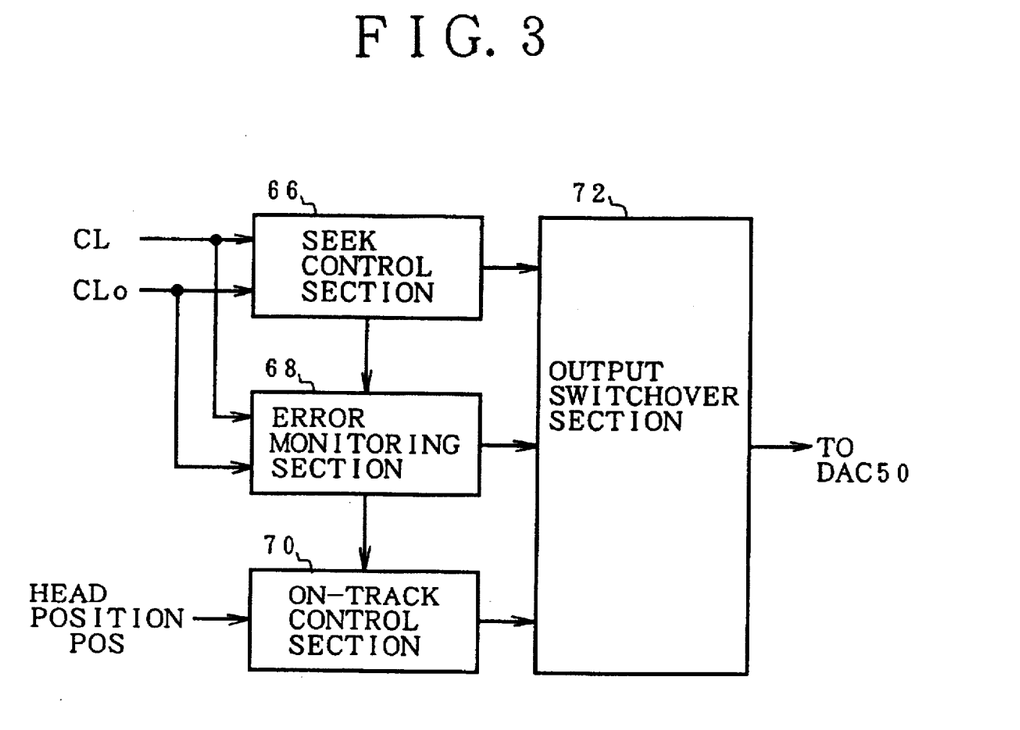
FIG. 3 is a block diagram of the head positioning function of the present invention achieved by the MPU shown in FIG. 2.

FIG. 3 is a functional block diagram of the head positioning control section materialized by the MPU 44 shown in FIG. 2. This positioning control section comprises a seek control section 66, an error monitoring section 68, an on-track control section 70 and an output switchover section 72. A cylinder address CL indicating the current position of the head and a target cylinder address $CL_0$ instructed by the seek command from the higher-level controller are given to the seek control section 68. The seek control section 66 determines, as the number of remaining cylinders, a difference before the target cylinder address CL by subtracting the current cylinder address CL from the target cylinder address $CL_0$ at the time of start of seek, and performs acceleration, constant-speed and deceleration control of the VCM 54 on the basis of the thus determined number of remaining cylinders. Such speed control by the seek control section 66 is known as coarse control. More specifically, acceleration control of the VCM 54 is conducted by determining an acceleration current corresponding to the number of remaining cylinders at start of seek, and outputting the result to the DA converter 50. When a prescribed head travelling speed is reached by the acceleration control, the control is changed over to constant-speed control which maintains a constant speed. During constant-speed control, decrease in the number of remaining cylinders to a predetermined value is monitored, and when the prescribed value is reached, the control is switched over to deceleration control. At the point when the number agrees with the target cylinder address, seek control is finished, and the control is switched over to fine control by the on-track control section 70. Fine control by the on-track control section 70 is a position control carried out to keep a head position signal POS available from the servo frame demodulating circuit 40 shown in FIG. 2 at the track center, and is usually called fine control. The cylinder position in on-track control is recognized by reading out the cylinder address recorded in the servo frame of that cylinder. In the present invention, an error monitoring section 68 is provided in addition to the seek control section 66 and the on-track control section 70 as described above. Upon start of seek operation by the seek control section 66, the error monitoring section 68 sets an optimum seek timeout time Ts on the basis of the number of cylinders corresponding to the difference between the then target cylinder address $CL_0$ and the current cylinder address CL, i.e., the seek distance, and monitors whether or not seek operation is completed within the set seek timeout time Ts. When seek operation is completed within the seek timeout time Ts set by the error monitoring section 68 and the target cylinder address is reached, the control is directly switched over to fine control by the on-track control section 70. When agreement with the target cylinder address $CL_0$ is achieved even when the seek timeout time Ts has been reached, this is judged to be occurrence of a seek error, and the control is forcedly switched over to fine control by the on-track control section 70. Even when the error monitoring section 68 judges occurrence of a seek error, the error is not reported to the higher-level controller.

Figure 4:
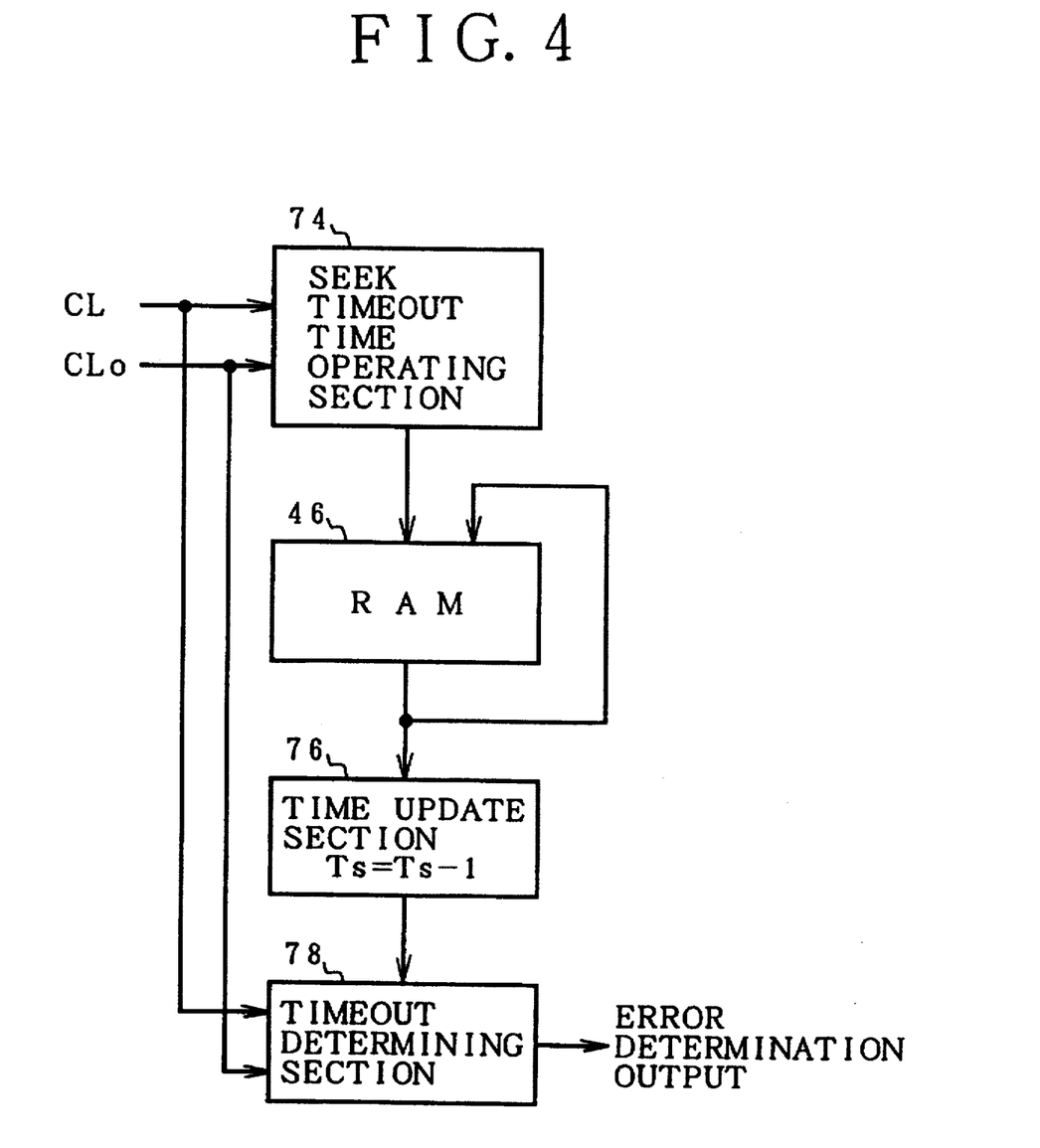
FIG. 4 is a block diagram showing the functions of a first embodiment of the error monitoring section shown in FIG. 3.

FIG. 4 illustrates an embodiment of the error monitoring section 68 shown in FIG. 3. The error monitoring section 68 comprises a seek timeout time calculating section 74, an RAM 46, a time update section 76 and a timeout judging section 78. The seek timeout time calculating section 74 calculates an optimum seek timeout time Ts from the target cylinder address $CL_0$ and the current cylinder address CL in accordance with linear interpolation.

Figure 5:
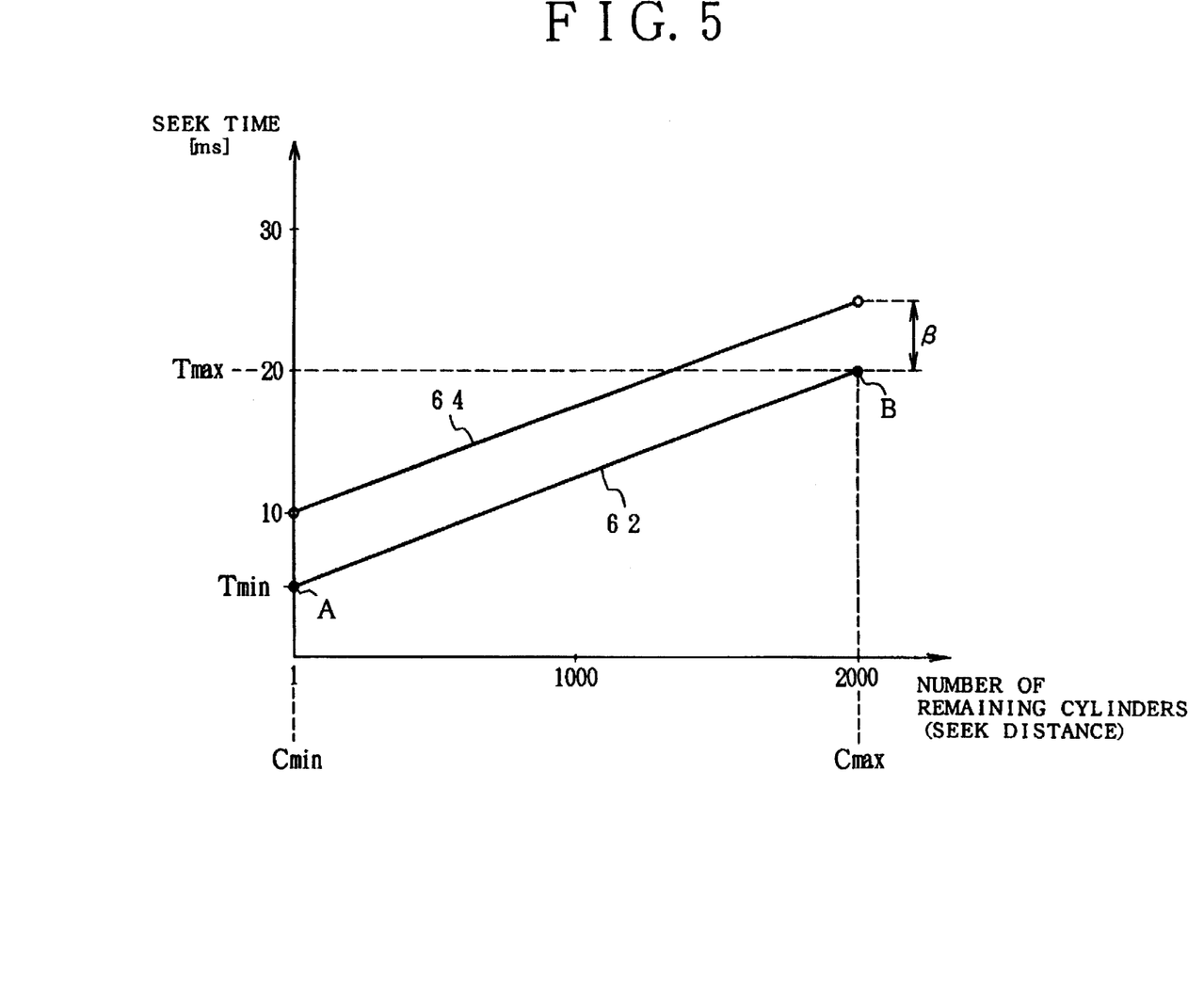
FIG. 5 is a relational diagram of the seek distance and the seek time calculated in the first embodiment shown in FIG. 3.

FIG. 5 shows calculation of a set time by the seek timeout time calculating section 74 shown in FIG. 4, in which the abscissa represents the seek distance as expressed by the number of cylinders C. In this embodiment, the minimum seek distance is equal to the minimum number of cylinders $C_{min}=1$ cylinder, and the maximum number of cylinders $C_{max}=2,000$ cylinders is used as the maximum seek distance. A minimum seek time $T_{min}$ and a maximum seek time $T_{max}$ are determined as seek times for each of the seek distances corresponding to the minimum number of cylinders $C_{min}$ and the maximum number of cylinders $C_{max}$. The minimum seek time $T_{min}$ and the maximum seek time $T_{max}$ may be measured values available from actual seek operation of the disk apparatus, or values available from design calculation. This determines points A and B. Assume therefore a straight line 62 connecting points A and B. A seek time Ts is calculated as a value corresponding to the number of cylinders after subtracting an arbitrary seek distance from the equation of this straight line 62, i.e., subtracting the current cylinder address from the target cylinder address. More specifically, if the straight line 62 has an inclination α, it is calculable from:

$$\alpha = (T_{max} - T_{min})/(C_{max} - C_{min}) \quad (1)$$

Once an inclination α of the straight line 62 is thus determined, the straight line 62 is defined by the following formula:

$$Ts = \alpha(CL_0 - CL) + T_{min} \quad (2)$$

For the seek timeout time calculating section 74 shown in FIG. 4, therefore, an inclination α and an initial value $T_{min}$ have previously been set as constants, and an optimum seek timeout time Ts according to equation (2) can be calculated by entering the target cylinder address $CL_0$ and the current cylinder address CL at the start of seek.

The seek timeout time Ts calculated by the seek timeout time calculating section 74 is set to a prescribed address of the RAM 46, and reduced one by one for each of certain periods during seek by the time update section 76. The timer of storing the set time Ts in the RAM 46 and reducing Ts at certain time intervals is known as a software timer. The timeout judging 78 monitors the timeout time Ts of the 46 to be updated by the time update section 76. When Ts=0 is achieved before the current cylinder address CL agrees with the target cylinder address $CL_0$, there are generated a seek error and an error determination output to cause switchover of the control to fine control at the on-track control section 70 shown in FIG. 3. While the seek timeout time calculating section 74 shown in FIG. 4 determines a time Ts in accordance with the straight line 62 shown in FIG. 5, it is practically desirable to calculate a seek timeout time Ts in accordance with a straight line 64 available by adding a prescribed margin β to the straight line 62. More particularly, the following formula is used in place of the above-mentioned equation (2):

$$Ts = \alpha(CL_0 - CL) + T_{min} + \beta \quad (3)$$

Figure 6:
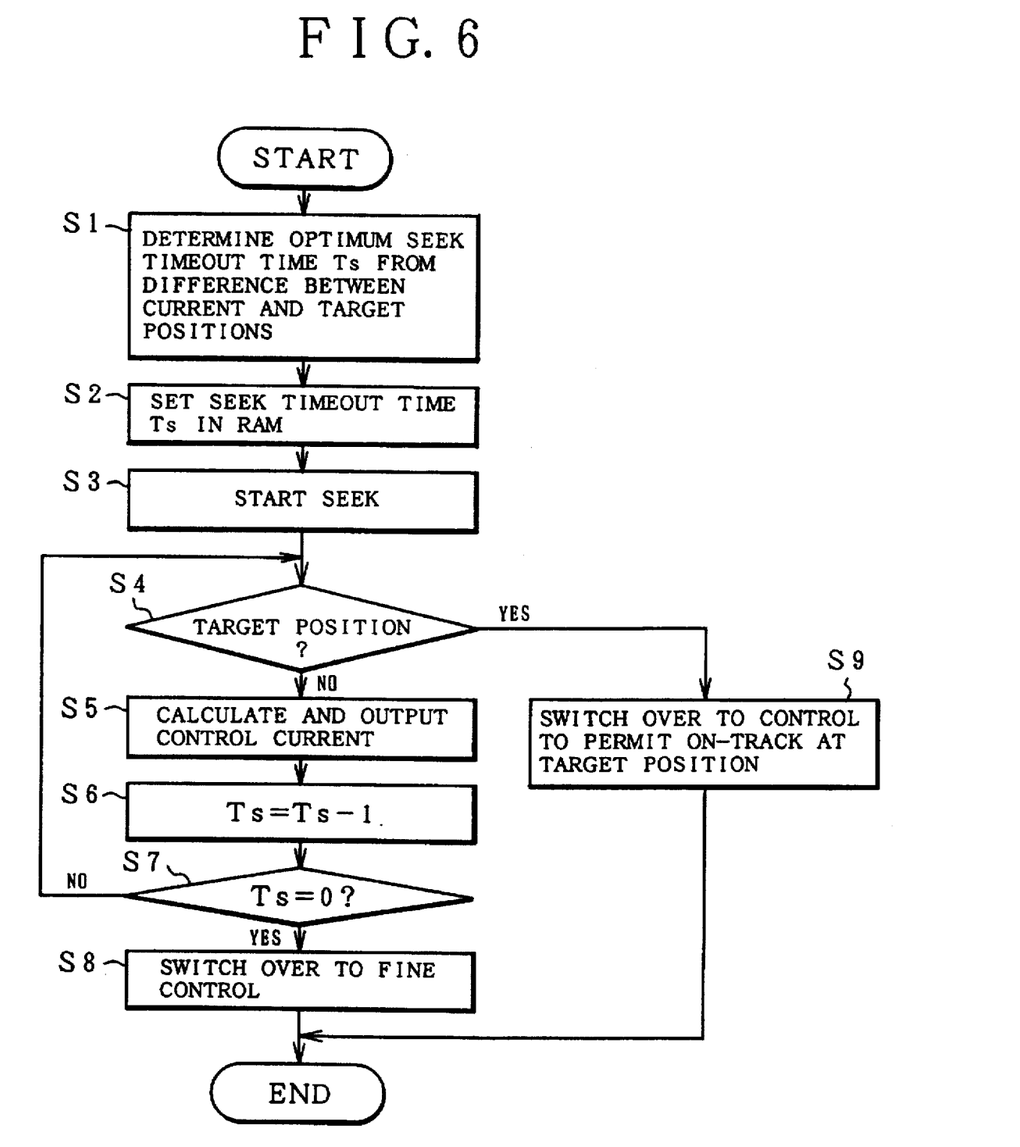
FIG. 6 is a flowchart of the seek processing of the present invention, in which control is switched over to fine control upon occurrence of an error.

FIG. 6 is a flowchart of seek processing of the present invention provided with the head positioning function as shown in FIG. 3, which is activated upon receipt of a seek command from the higher-level controller. First in step S1, an optimum seek timeout Ts is determined in accordance, for example, with linear interpolation shown in FIG. 5, on the basis of the seek distance derived from the difference between the current position based on the current cylinder address CL and the target position based on the target cylinder address $CL_0$. Then in step S2, the seek timeout time Ts set in the RAM 46, and seek operation is started in step S3. Subsequently in step S4, it is checked if the current cylinder address is at the target position agreeing with the target cylinder address. If it is not at the target position, control current for acceleration, constant-speed or deceleration is calculated in step S5 in response to the then number of cylinders remaining before the target track address, and the result is output to the VCM 54. Then in step S6, the seek timeout time Ts set in the RAM 46 is reduced by one, and in step S7, it is checked if 0 has been reached. If it is determined in step S4 that the target position has been reached by the current cylinder address CL agreeing with the target cylinder address $CL_0$ before Ts=0 is reached in step S7, the control is switched over in step S9 to fine control for bringing the head on track at the target position, thus resulting in normal end of seek processing. When, on the other hand, the target position has not as yet been reached when Ts=0 is achieved in step S7 because normal seek operation has been prevented by external vibration during seek operation, the processing advances to step S8 to forcedly switch over the control to fine control. This forced switchover to fine control in step S8 is forcedly carried out at an arbitrary timing during constant-speed control or deceleration control in seek operation. For example, when changing over the control from constant-speed control to fine control, the very large inertia of the head actuator leads to a considerably long travel distance after switchover even under the action of braking of switchover to fine control, and fine control which positions the head is accomplished at a cylinder address at the moment when the head speed approaches 0 under the effect of deceleration by fine control. During deceleration, in contrast, because inertia of the head actuator is reduced, forced switchover to fine control does not cause much shift of the head, and it is possible to position the head at any cylinder address near the cylinder address where the head as been located upon switchover to fine control. It should be noted here that if on-track is within a prescribed range of the number of cylinders relative to the target cylinder address upon switchover to fine control, it is possible to position the head by fine control finally at the target cylinder address. Positioning of the head at the target cylinder address by fine control alone as described above is possible within a range of ±8 cylinders. Therefore, if the cylinder address where the head is positioned at the time of forced switchover to fine control upon occurrence of a seek error is within a range of ±8 cylinders from the target cylinder address, it is possible to position the head at the target cylinder address directly by fine control. More specifically, it suffices to read out the cylinder address at which the head has been positioned along with occurrence of a seek error in step S8 from servo information, recognize the position of the target cylinder address, and repeat one-cylinder seek operation of positional cylinder by a necessary number of cylinders. Such one-cylinder cylinder seek operation can be performed only on the disk drive side, without depending upon a seek command from the higher-level controller. Even when the position is not within ±8 cylinders relative to the target cylinder address, it is possible to position the head by fine control at the cylinder address at which the head is located at the timing of switchover to fine control. The cylinder address at which the head is located in this state is read out to report the error to the higher-level controller, and seek operation is conducted in response to a retry command. In this case also, since the head does not come back to the initial position as in the retract operation in the conventional process, it is possible to resume seek operation in the middle of the target cylinder, and thus to finish seek operation by retry within a short period of time.

Figure 7:
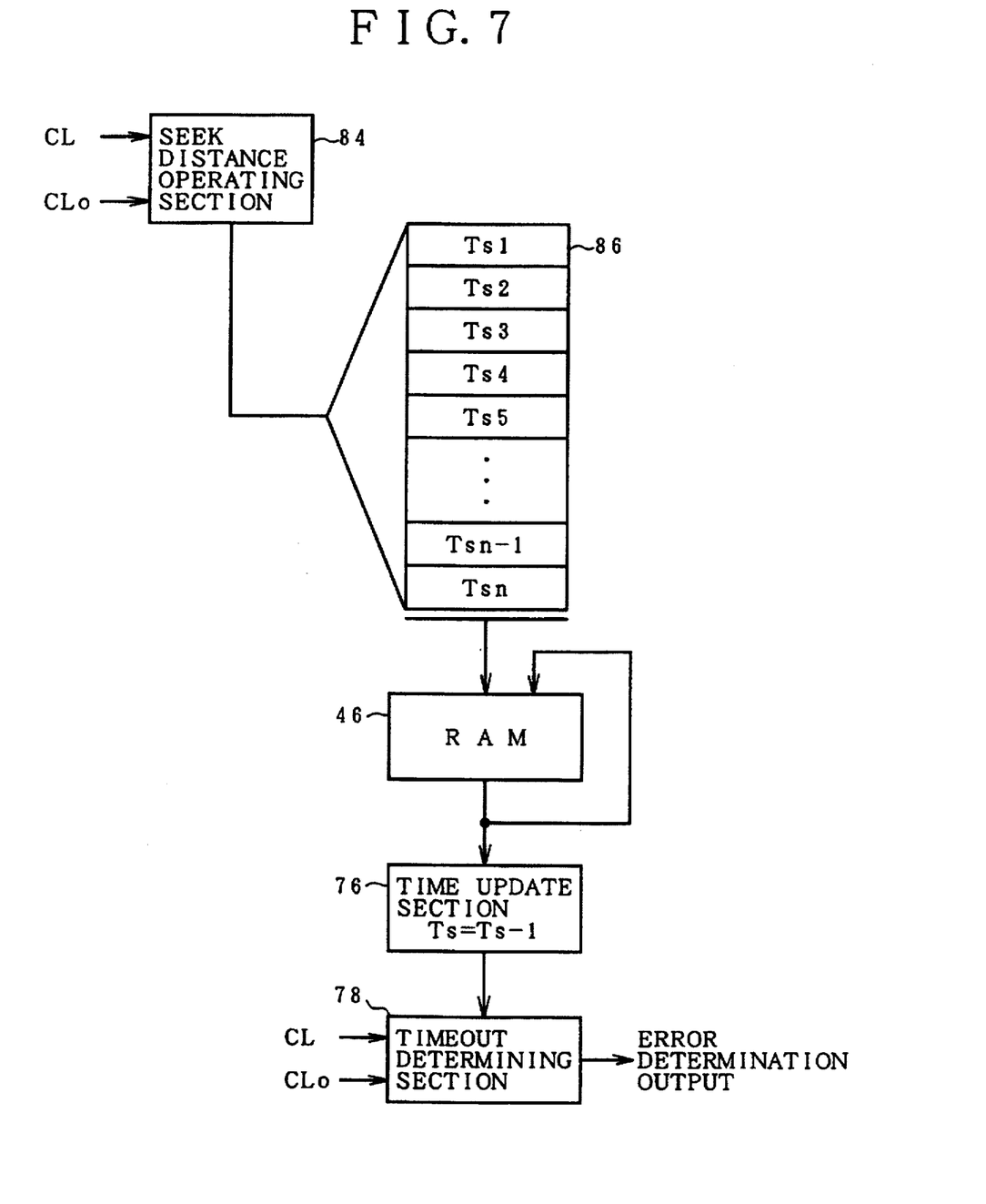
FIG. 7 is a block diagram showing the functions of a second embodiment of the error monitoring section shown in FIG. 3.
Figure 8:
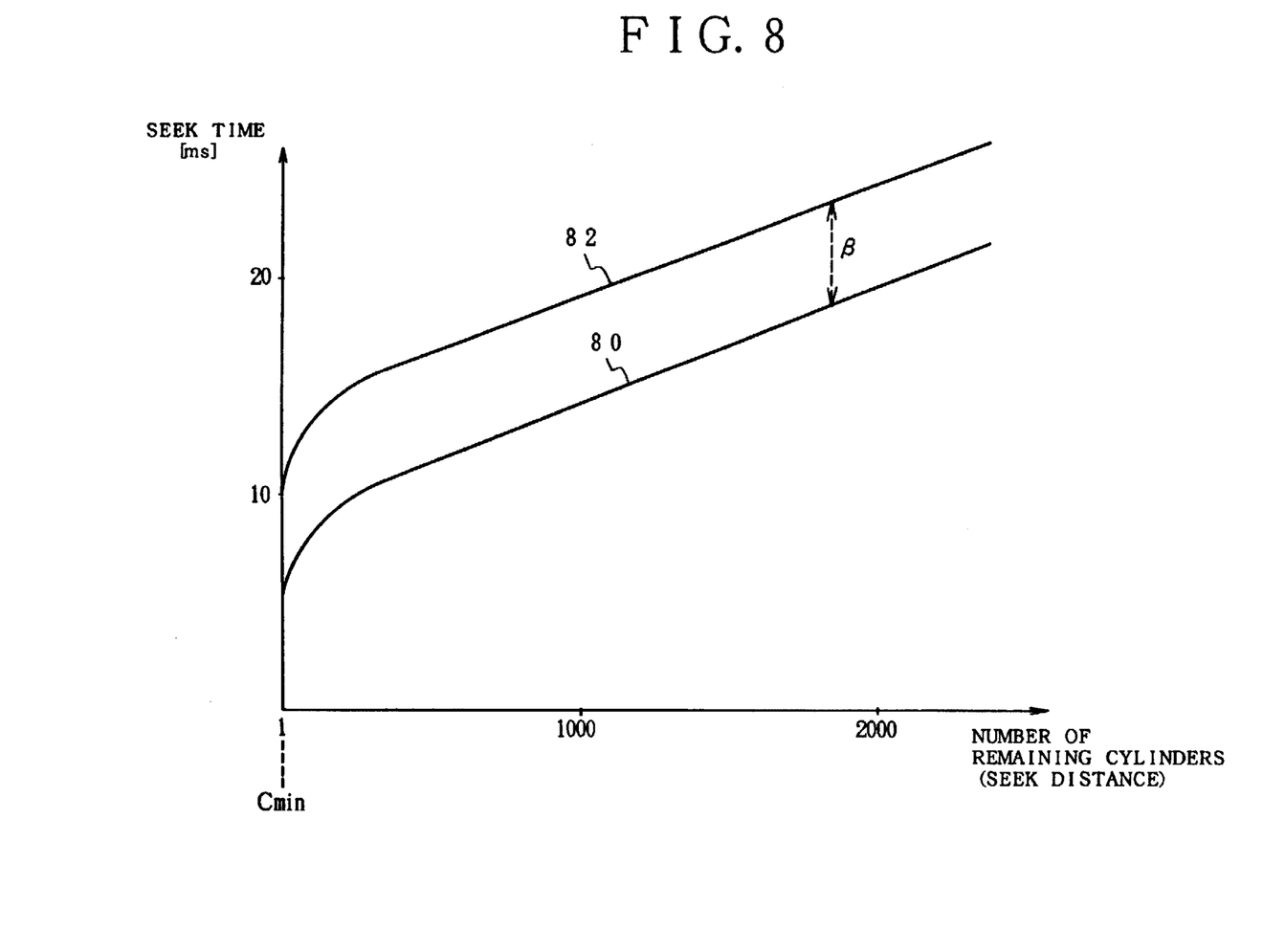
FIG. 8 is a relational diagram of the seek distance and the seek time calculated in the second embodiment shown in FIG. 7.

FIG. 7 shows another embodiment of the error monitoring section 68 shown in FIG. 3. In this embodiment, a table is prepared as a seek information storing section from the measured values of seek time relative to the seek distance, and an optimum seek timeout time Ts is set with reference to this table. The error monitoring section in this embodiment comprises a seek distance calculating section 84, a table 86, a RAM 46, a time update section 76 and a timeout judging section 78. The seek distance calculating section 84 calculates the number of cylinders remaining after subtracting the current cylinder address CL at the start of seek operation from the target cylinder address $CL_0$ as instructed by the seek command, i.e., the seek distance. The set times Ts1 to Tsn corresponding to measured results of seek time relative to the seek distance shown in FIG. 8 are registered in the table 86. The curve 80 covers plots of measured values of seek time relative to the number of cylinders corresponding to the seek distances represented on the abscissa. The seek time for the minimum number of cylinders $C_{min}=1$ cylinder corresponding to the minimum seek distance is about 5 ms. Along with increase in the seek distance, the seek time first sharply increases, but thereafter, proportionally increases along a straight line. The relationship of the seek time with the seek distance is non-linear as is typically indicated by the characteristic curve shown in FIG. 8. By using the table 86 shown in FIG. 7 in accordance with the characteristic curve 80, therefore, it is possible to set a seek timeout time Ts of error monitoring relative to the seek distance more appropriately than the time set through linear interpolation along the straight line 62 connecting the two points shown in FIG. 5.

The table 86 stores values of time according to a characteristic curve 82 obtained by adding a prescribed margin β to the characteristic curve 80, with seek timeout times Ts1 to Tsn as indices, which have addresses equal to the numbers of tracks after subtraction of the current cylinder address CL from the target cylinder address $CL_0$ indicating the seek distances derived from the characteristic curve 80. In the embodiment shown in FIG. 7, therefore, processing comprises the steps of referring to the table 86 with an address based on the number of cylinders remaining after subtracting the current cylinder address CL from the target cylinder address $CL_0$ calculated by the seek distance calculating section 84 at the start of seek operation, determining the corresponding seek timeout time Ts, setting same in the RAM 46, and performing update by the time update section 76 and error judgement by the timeout judging section 78, in the same manner as in the embodiment shown in FIG. 4.

Figure 9:
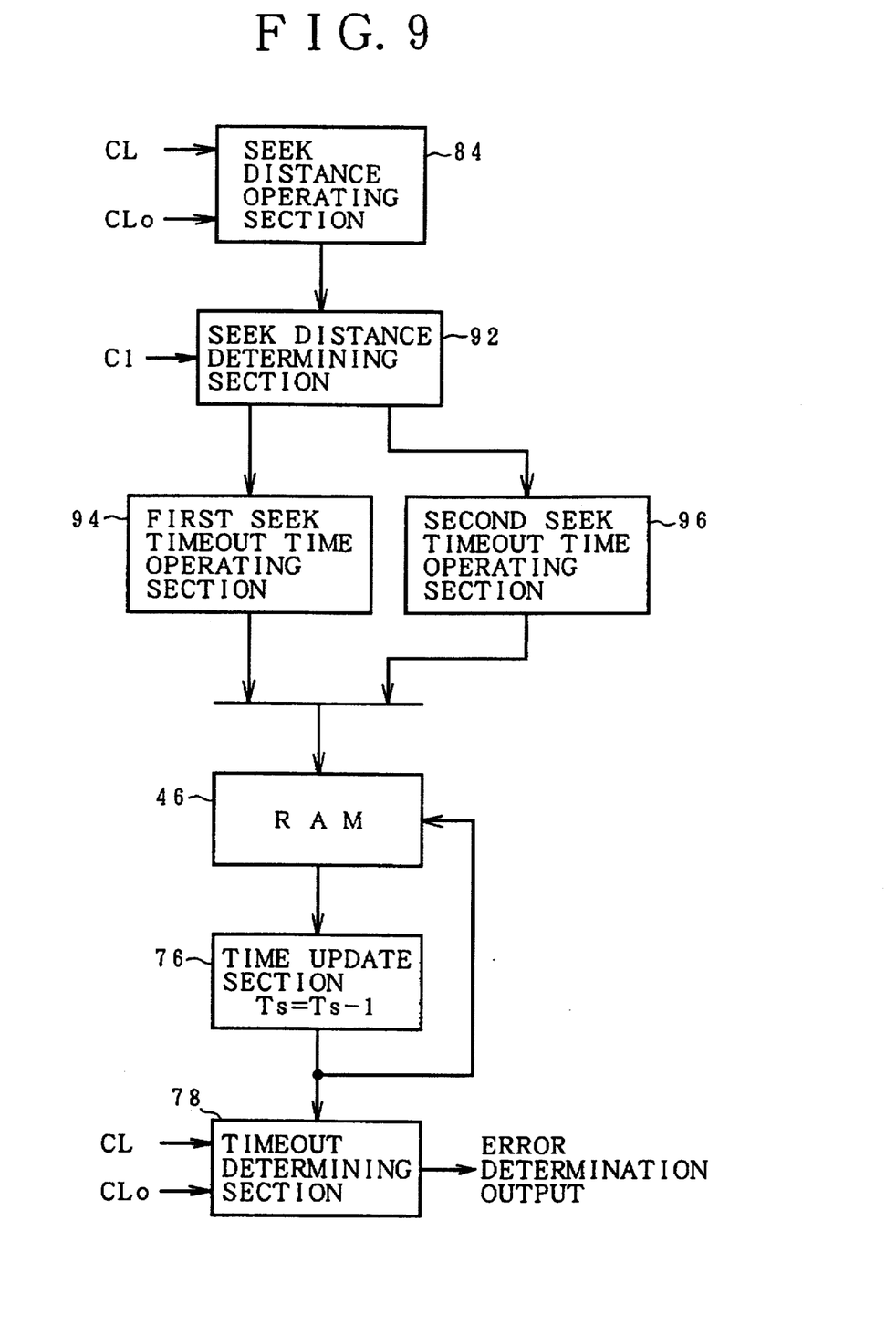
FIG. 9 is a block diagram showing the functions of a third embodiment of the error monitoring section shown in FIG. 3.

FIG. 9 shows another embodiment of the error monitoring section 68 shown in FIG. 3. In this embodiment, the actually measured characteristic curve shown in FIG. 8 is simplified through polygonal-line approximation to set a seek timeout time. In this embodiment, the error monitoring section comprises a seek distance calculating section 84, a seek distance determining section 92, a first seek timeout time calculating section 94, a second seek timeout time calculating section 96, an RAM 46, a time update section 76, and a timeout judging section 78.

Figure 10:
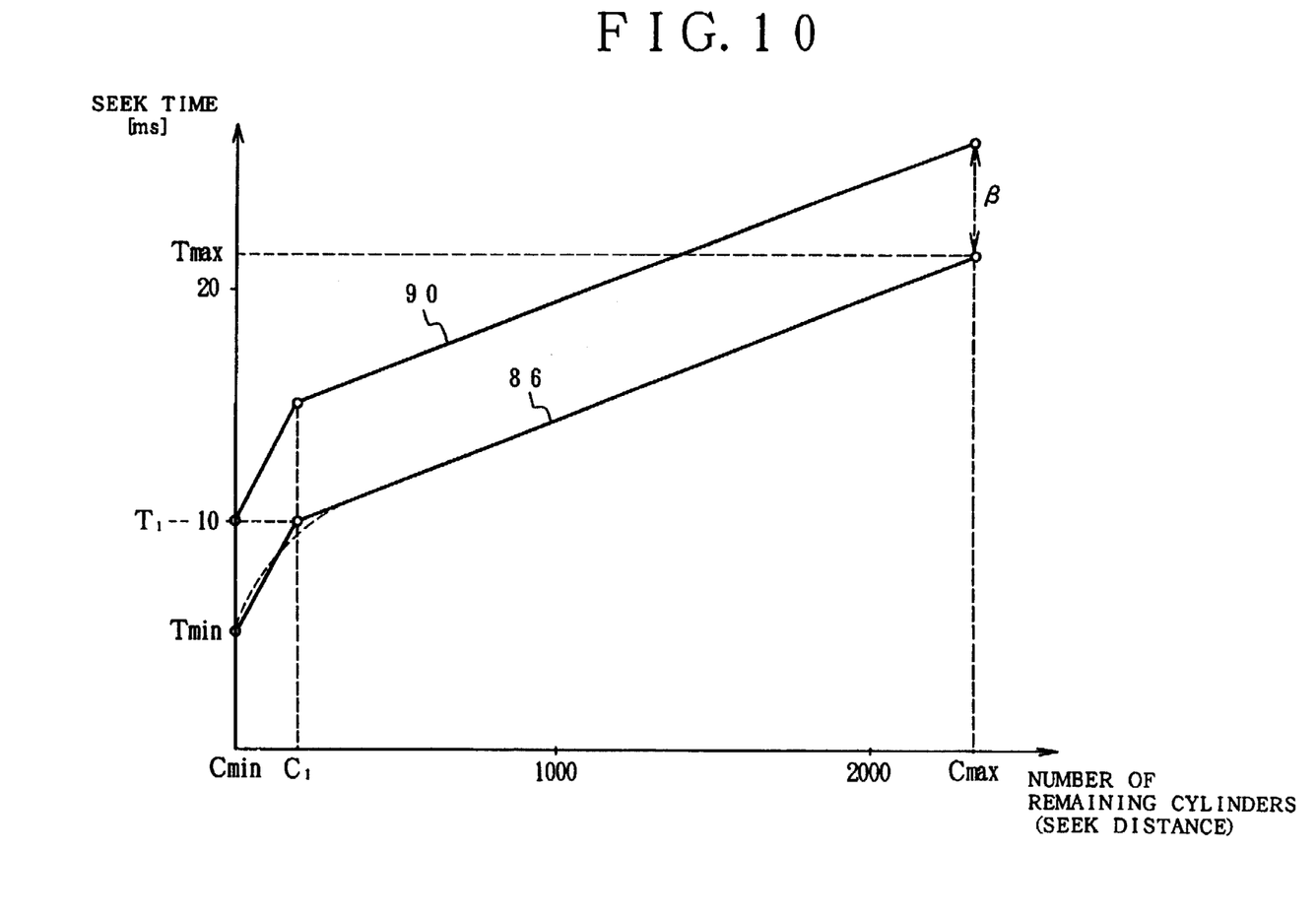
FIG. 10 is a relational diagram of the seek distance and the seek time calculated in the third embodiment shown in FIG. 9.

FIG. 10 is a characteristic diagram used for calculating the seek timeout time as shown in FIG. 9, in which the characteristic curves 80 and 82 shown in FIG. 8 are polygonal-line-approximated by straight lines 84 and 86 as shown in FIG. 10. Practically, polygonal-line approximation is employed with straight lines 88 and 90 obtained by adding β.

The seek distance calculating section 84 shown in FIG. 9 determines the number of remaining cylinders indicating the seek distance obtainable by subtracting the current cylinder address CL from the target cylinder address $CL_0$ at the start of seek, and outputs the result to the seek distance judging section 92. The number of remaining cylinders C1 forming the connecting point of the straight lines 88 and 90 is set as a reference value in the seek distance judging section 92. When a value is under the reference value C1, the first seek timeout time calculating section 94 is selected, which calculates a seek timeout time Ts corresponding to the straight line 88 and sets the result in the RAM 46. If a value is over the reference value C1, the second timeout time calculating section 96 is selected, which calculates a seek timeout time Ts corresponding to the straight line 90, and sets the result in the RAM 46. Time update by the time update section 76 and error judgement by the timeout judging section 78 are carried out in the same manner as in the first embodiment shown in FIG. 4. Although FIG. 10 illustrates a case of polygonal-line approximation with two straight lines, the degree of approximation may be improved by dividing the curve into more straight lines.

Figure 11:
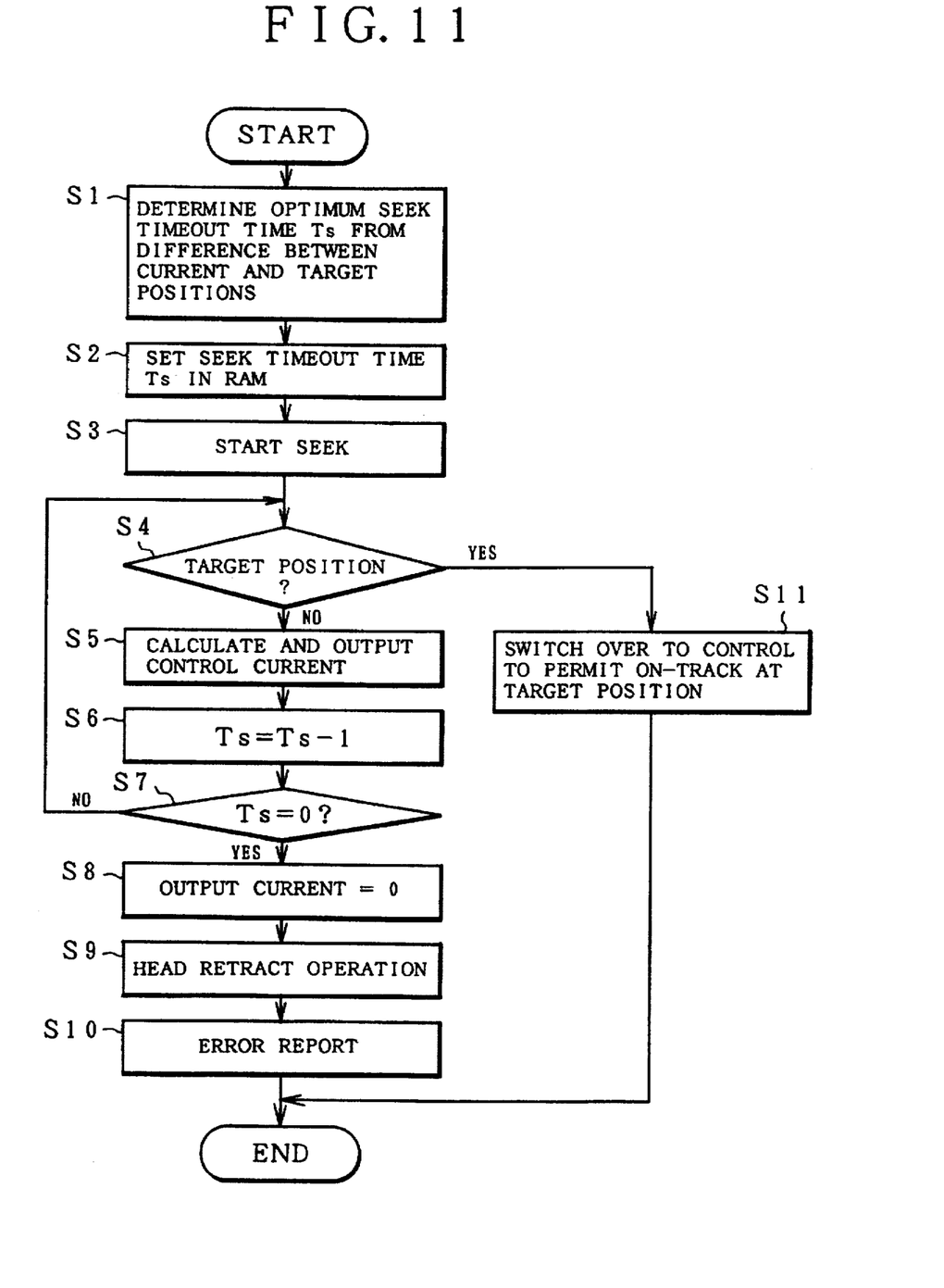
FIG. 11 is a flowchart of the seek processing of the present invention, in which only the seek timeout time is variably set in response to the seek distance.

FIG. 11 is a flowchart illustrating another embodiment of seek processing in the present invention. This embodiment is characterized in that only a seek timeout time Ts can be variably set in response to the seek distance. Forced switchover to fine control upon judging a seek error as shown in FIG. 6 is not performed in this embodiment. More specifically, the processing comprises the steps of determining an optimum seek timeout time Ts from the seek distance derived from the difference between the current position and the target position in step S1, setting Ts in the RAM in step S21, and starting seek operation in step S3.

The processes of steps S4 to S7 during seek operation are the same as those shown in the flowchart of FIG. 6. When Ts=0 is reached during seek and this is judged to be a seek error, however, the control is not forcedly switched over to fine control as in the embodiment shown in FIG. 6, the output current is rendered 0 in step S8, performing retract operation for bringing the head back to the initial position in step S9, and an error report is submitted in step S10. In this embodiment shown in FIG. 11, since it is possible to set an optimum seek timeout time Ts for seek operation in response to the seek distance, the time required from the point upon the lapse of a seek time necessary for reaching the target cylinder for each seek distance to the error judgement can be kept substantially constant irrespective of the extent of the seek distance. Therefore, as compared with the conventional seek timeout time which has fixedly been determined on the basis of the seek time of the maximum seek distance, it is possible to promptly judge a seek error in the case of a short seek distance and conduct recovery operation. Because retract operation for bringing the head back to the initial position is performed without forcedly switching over the control to fine control upon judgement of a seek error as in FIG. 6, a target cylinder address located on the outer side results in a longer seek distance during retry operation. Even with a long seek distance, the sufficiently short time required for judging a seek error can improve the performance as a whole. It is needless to mention that the seek timeout time in the embodiment shown in FIG. 11 may be set by using any of those shown in FIGS. 4, 7 and 9.

Figure 12:
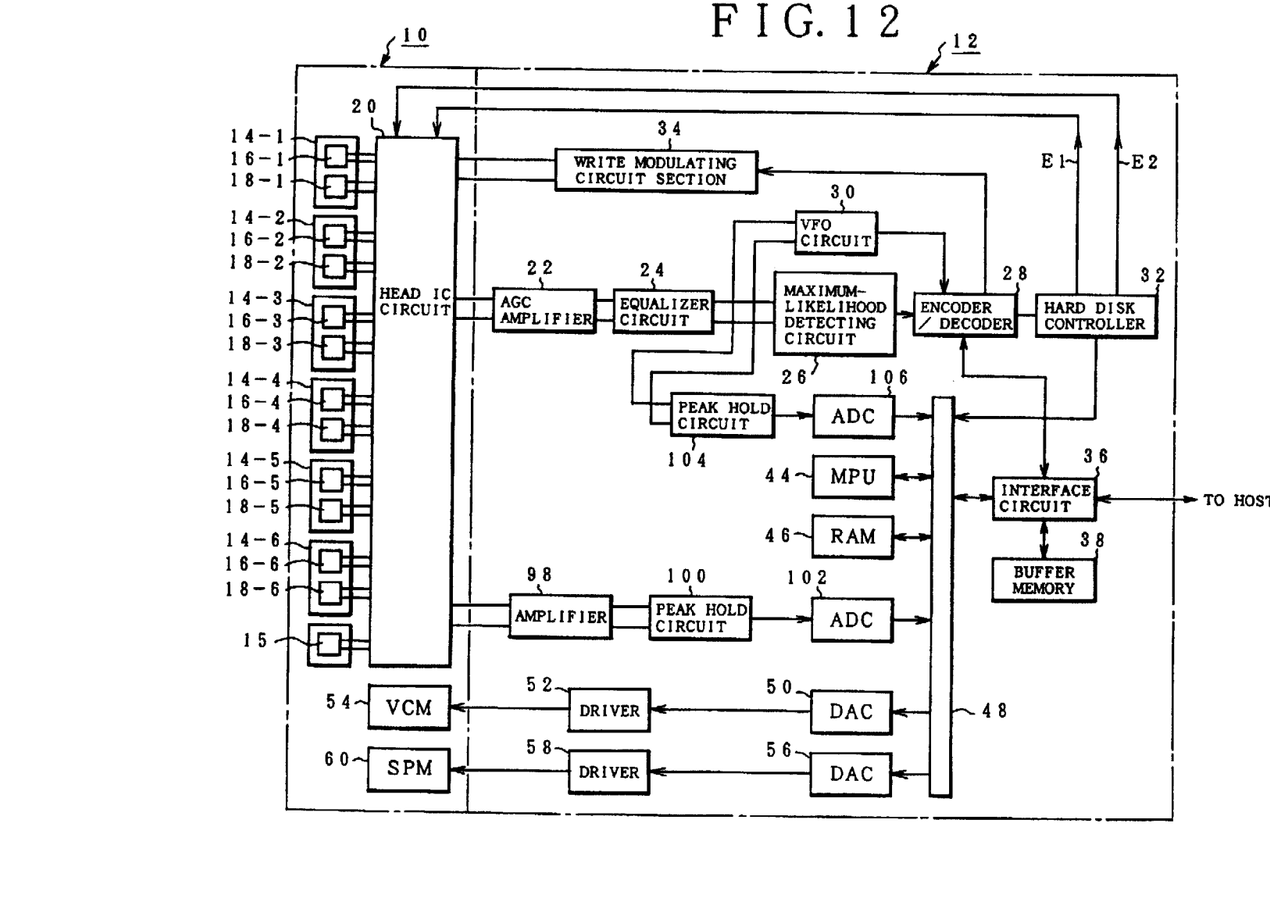
FIG. 12 is a block diagram of another embodiment of the present invention adopting servo face servo.

FIG. 12 illustrates another embodiment of the disk apparatus to which the present invention is applicable. This embodiment is characterized in that data face servo (sector servo) is adopted. The data face servo records servo information with the disk surface of one of a plurality of disk media as the servo face for exclusive use. For this purpose, a disk enclosure 10 is provided with a servo head 15, in addition to composite type heads 14-1 to 14-6. The servo head 15 is fixedly connected to an amplifier 96 of a drive controller 12 through a head IC circuit. Servo readout signal read out by the servo head 15 is amplified by the amplifier 98. Then, a peak value of readout waveform is detected by a peak hold circuit 100 and fetched into an MPU 42 at a DA converter 102, thus determining a head position. In the case of servo face servo, on the other hand, servo information for detecting thermal offset is recorded in the outermost guard band area, for example, of the data face, with a view to correcting fluctuations of offset caused by the environmental temperature of the data face relative to the servo face. For the purpose of reading out this servo information for thermal offset of the data face, output of the equalizer circuit 24 is entered into a peak hold circuit 104, and the result of peak hold of the data face servo information is fetched into the MPU 42 by an AD converter 106. At this point, an offset is measured from the difference from the head position based on the servo face, as available at the servo head 15, to prepare an offset correction table on the RAM 46. Preparation of the offset table is accomplished at the time of power-on of the apparatus, and subsequently at certain time intervals. The offset table of the RAM 46 corrects a positional shift of the head on the data face based on the servo face servo information by offset-correcting the information read out from the offset table for positioning control to the target cylinder address during read or write operation for which the control has been switched over to fine control upon completion of seek. Also for the disk apparatus shown in FIG. 12, adopting such servo face servo, the embodiments shown in FIGS. 3 to 11 can directly be applied as a head positioning function based on the MPU 42 as in the case of the disk apparatus adopting the data face servo shown in FIG. 2.

According to the present invention, as described above, it is possible to eliminate the necessity of retract operation which brings the head back to the initial position by forcedly switching over the control from coarse control to fine control on the drive unit side upon occurrence of a seek error, to permit positioning at the target cylinder position by fine control or resumption of seek operation by retry operation in a switched state to fine control, and to improve the processing performance by reducing the seek processing time as a whole by inhibiting occurrence of an error in positioning at the target cylinder. As compared with the conventional seek timeout time fixedly determined, it is possible to largely improve the seek performance as a whole because of the possibility to considerably reduce the time required for judging a seek error in a particularly short seek distance and to promptly conduct recovery operation, since the time between arrival at a proposed target position and judgement as an error becomes substantially constant irrespective of the cylinder distance and the seek distance by variably setting a seek timeout time used for the judgement of a seek error in response to the seek distance.

The present invention is not limited by the embodiments presented above, and appropriate variations are possible so far as an optimum seek timeout time can be set depending upon the seek distance. The present invention is not limited by numerical values presented in the above-mentioned embodiments.

What is claimed is:

1. A disk apparatus comprising:
   seek control means which moves a head by speed control to a target cylinder position of a disk medium as instructed by a higher-level device;
   on-track control means which, upon determination of arrival of said head at the target cylinder position by said seek control means, switches over the control to fine control to position said head at said target cylinder position for followup; and
   error monitoring means which sets seek timeout time in response to the seek distance between the current head position and the target position at the start of seek to monitor seek operation of said seek control means, judges as an error the lapse of said seek timeout time in a state in which arrival of said head at the target cylinder position is not determined, and forcedly switches over the control to fine control by said on-track control means without reporting an error to the higher-level device.

2. An apparatus according to claim 1, wherein said error monitoring means calculates and sets a seek timeout time corresponding to the seek distance between the current position of the head and the target position at the start of seek, from a straight line connecting two points determined by the seek distance and the seek time thereof.

3. An apparatus according to claim 1, wherein said error monitoring means has seek information storing means which stores results of measurement of the seek time relative to the seek distance, and sets a seek timeout time with reference to said seek information storing means, depending upon the seek distance between the current position of the head and the target position at the start of seek.

4. An apparatus according to claim 1, wherein said error monitoring means polygonal-line-approximates the result of measurement of the seek time relative to the seek distance with a plurality of straight lines, and calculates and sets a seek timeout time from a corresponding one from among said plurality of straight lines, in response to the seek distance between the current position of the head and the target position at the start of seek.

5. An apparatus according to claim 1, wherein said disk medium detects the head position on the basis of sector servo information padded and recorded between sectors on the data face.

6. An apparatus according to claim 1, wherein said disk medium detects the head position on the basis of special servo face servo information which records only servo information.

7. A disk apparatus comprising:
   seek control means which moves a head by speed control to a target cylinder position of a disk medium as instructed by a higher-level device;
   on-track control means which, upon determination of arrival of said head at the target cylinder position by said seek control means, switches over the control to fine control to position said head at said target cylinder position for followup; and
   error monitoring means which sets seek timeout time in response to the seek distance between the current head position and the target position at the start of seek by said seek control means, judges as an error the lapse of said seek timeout time before arrival at the target cylinder position is judged, and reports said error to the higher-level device after bringing said head back to the original position thereof.

8. An apparatus according to claim 7, wherein said error monitoring means calculates and sets a seek timeout time corresponding to the seek distance between the current position of the head and the target position at the start of seek, from a straight line connecting two points determined by the seek distance and the seek time thereof.

9. An apparatus according to claim 7, wherein said error monitoring means has seek information storing means which stores results of measurement of the seek time relative to the seek distance, and sets a seek timeout time with reference to said seek information storing means, depending upon the seek distance between the current position of the head and the target position at the start of seek.

10. An apparatus according to claim 7, wherein said error monitoring means polygonal-line-approximates the result of measurement of the seek time relative to the seek distance with a plurality of straight lines, and calculates and sets a seek timeout time from a corresponding one from among said plurality of straight lines, in response to the seek distance between the current position of the head and the target position at the start of seek.

11. An apparatus according to claim 7, wherein said disk medium detects the head position on the basis of sector servo information padded and recorded between sectors on the data face.

12. An apparatus according to claim 7, wherein said disk medium detects the head position on the basis of special servo face servo information which records only servo information.

* * * * *